UNITED STATES PATENT OFFICE.

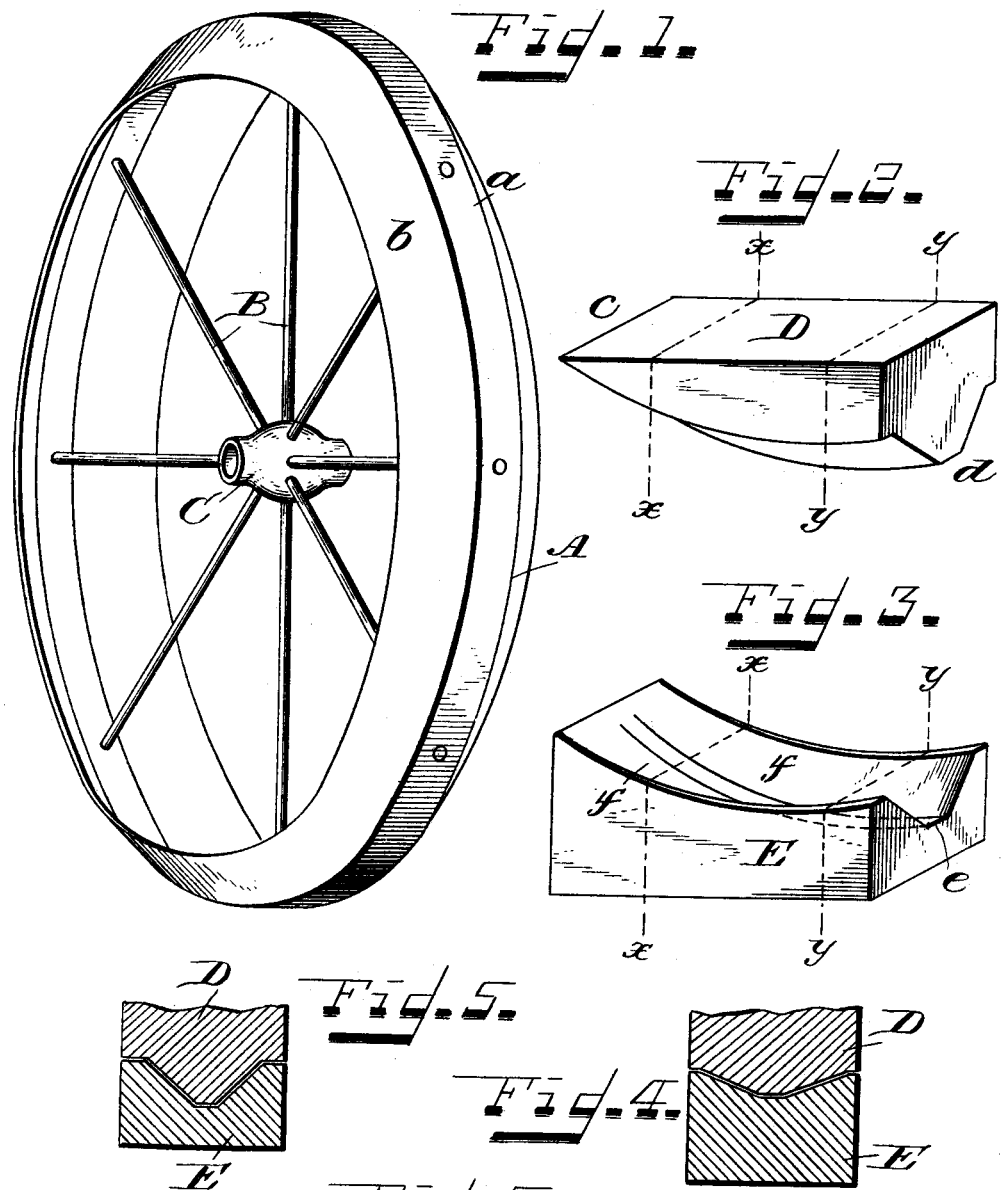

ALBERT J. GREEN, OF DAYTON, OHIO, ASSIGNOR TO THE STODDARD MANUFACTURING COMPANY, OF SAME PLACE.

DIE FOR SHAPING METAL PRESS-WHEELS.

SPECIFICATION forming part of Letters Patent No. 518,668, dated April 24, 1894.

Application filed August 16, 1893. Serial No. 483,284. (No model.)

*To all whom it may concern:*

Be it known that I, ALBERT J. GREEN, a citizen of the United States, residing at Dayton, in the county of Montgomery and State of Ohio, have invented certain new and useful Improvements in Dies for Forming Press-Wheel Rims, of which the following is a full, clear, and exact description, reference being had to the accompanying drawings, forming part of this specification.

My invention relates particularly to dies for forming that class of wheels intended to be used with what are known as "press drills," that is grain drills in which there is a press wheel following each hoe or runner to firm the ground over the planted seed and to produce a pronounced furrow in which the earth will be packed at both the sides and bottom for the better retention of the moisture, and to cause the speedier and more sure germination of the seed.

The object of my invention is the economical production of the rims of such wheels, of a single piece or blank of metal, irrespective of the construction of the remainder of the wheel, for it is this rim, with its approximately V shape in cross section, which is the effective medium in producing the result required.

The novelty of my invention will be hereinafter set forth and specifically pointed out in the claim.

In the accompanying drawings: Figure 1 is a perspective view of a wheel embodying my invention. Fig. 2 is a perspective view of a male die to be used in producing the rim of my improved wheel. Fig. 3 is a corresponding view of a female die to be used in connection with the male die. Fig. 4 is a transverse section through both dies when brought together on the dotted line X X of Figs. 2 and 3. Fig. 5 is a corresponding view on the dotted line Y Y of Figs. 2 and 3. Fig. 6 is a transverse section of the rim or tire of the wheel.

The same letters of reference are used to indicate identical parts in all the figures.

As my invention relates only to the construction of the exterior rim or tire of the wheel, the other parts of which may be of any desired construction, it is only necessary to say, in referring to Fig. 1, that A is the rim or tire substantially V shaped in cross section, or with a horizontal portion $a$ to press the bottom of the furrow, and beveled side portions $b$ to press the sides of the furrow.

B are the spokes, and C the hub of the wheel of any desired construction though preferably of metal. Wheels of this character with rims having the same external shape I understand to be old, but such wheels heretofore have had their rims or tires built up of two or three pieces of metal requiring to be welded or united on lines extending circumferentially of the wheel, thus entailing considerable labor and expense and producing a wheel liable to separate on the lines of juncture.

The rim or tire of my improved wheel is constructed of a single blank or piece of metal given the proper shape in cross section and the proper circumferential curvature, with its abutting ends welded or otherwise secured together on a transverse line, or in the case of large wheels it may be constructed of two or more of such integral sections united together on transverse lines; and in the carrying out of my invention I employ a male die D, Figs. 2, 4 and 5 whose contact side longitudinally is convexly curved to give the circumferential curvature to the tire or rim blank A, and whose contact side transversely tapers from a flat, or substantially flat feeding-in end $c$ to a gradually narrowing V shape to the discharge end $d$. The female die E Figs. 3, 4 and 5 has on its contact side a concave channel to which the contact side of the die D fits and which has a tapering channel $e$ with beveled walls $f$, the angle of inclination of said walls relative to a horizontal plane gradually increasing from the feeding-in end of the die to the discharge end thereof, to give gradually increasing depth and decreasing width to the said channel, the projecting portion of the male die being formed to have increasing projection and decreasing width from its feeding-in end to its discharge end, to correspond to the form of the channel of the female die. The die E is stationary and the die D secured to any power device as a hammer or press to bring it down upon the die E with a blow of sufficient force to bend the metal. The flat blank from which the tire is to be formed is fed in between the dies at the flat end $c$ and is advanced slowly about two inches at a time after each blow so that when it leaves the opposite end of the dies it has its proper shape in cross section and its proper circumferential curvature. I have found from actual experience with dies of this character that the metal blank can be thus shaped without any buckling or overlapping of the edges.

A press wheel having its rim constructed as above forms the subject of a separate application filed October 6, 1893, Serial No. 487,338.

Having thus fully described my invention, I claim—

The curved dies D and E having inclined sides to form a V-shaped rim, the angles of inclination of said sides gradually increasing from the feeding-in ends of said dies to the discharge ends thereof, to give gradually increasing projection and decreasing width to the male die D and increasing depth and decreasing width to the female die E, to operate substantially as set forth.

ALBERT J. GREEN.

Witnesses:
C. G. STODDARD,
W. W. BARNETT.